United States Patent
Fan et al.

(10) Patent No.: US 10,841,407 B2
(45) Date of Patent: Nov. 17, 2020

(54) MOBILE TERMINAL AND ELECTRONIC APPARATUS

(71) Applicant: GUANGDONG OPPO MOBILE TELECOMMUNICATIONS CORP., LTD., Guangdong (CN)

(72) Inventors: Xiaoyu Fan, Guangdong (CN); Zhengshan Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 10 days.

(21) Appl. No.: 16/215,260

(22) Filed: Dec. 10, 2018

(65) Prior Publication Data
US 2019/0253536 A1    Aug. 15, 2019

(30) Foreign Application Priority Data
Feb. 9, 2018   (CN) .......................... 2018 2 0234928

(51) Int. Cl.
*H04M 1/02* (2006.01)
*G06F 1/16* (2006.01)

(52) U.S. Cl.
CPC ........ *H04M 1/0235* (2013.01); *G06F 1/1686* (2013.01); *H04M 1/0237* (2013.01);
(Continued)

(58) Field of Classification Search
CPC .......................... H04M 1/0235; H04M 1/0249
See application file for complete search history.

(56) References Cited

U.S. PATENT DOCUMENTS

| | | | | |
|---|---|---|---|---|
| 7,512,427 B2 * | 3/2009 | Finke-Anlauff | ...... | G06F 1/1624 345/168 |
| 7,557,851 B2 * | 7/2009 | Ohashi | ................ | H04M 1/0214 348/333.06 |

(Continued)

FOREIGN PATENT DOCUMENTS

| CN | 204156928 U | 2/2015 |
|---|---|---|
| CN | 106899721 A | 6/2017 |

(Continued)

OTHER PUBLICATIONS

International search report for Application No. PCT/CN2018/121565, dated Mar. 15, 2019 (9 pages).
(Continued)

*Primary Examiner* — Muthuswamy G Manoharan
(74) *Attorney, Agent, or Firm* — Ladas & Parry LLP

(57) ABSTRACT

The present disclosure provides a mobile terminal, which may include a housing; a mother board arranged into the housing; a first display screen coupled to the mother board. The first display screen may be arranged on a front side face of the housing. A storage groove may be defined on a top end face of the housing. The storage groove may be located between the front side face and the rear side face and may extend to and penetrate a left side face and a right side face of the housing. The mobile terminal may further include a mounting frame; a first camera arranged on the mounting frame and also coupled to the mother board. The mounting frame may be configured to extend itself out of the storage groove to expose the first camera or retract itself into the storage groove to hide the first camera into the housing.

20 Claims, 15 Drawing Sheets

(52) U.S. Cl.
CPC ....... *H04M 1/0249* (2013.01); *H04M 1/0264* (2013.01); *G06F 1/1624* (2013.01)

(56) References Cited

U.S. PATENT DOCUMENTS

| | | |
|---|---|---|
| 2003/0078082 A1 | 4/2003 | Su |
| 2006/0240881 A1* | 10/2006 | Cho .................... H04M 1/0235 455/575.4 |
| 2010/0081470 A1* | 4/2010 | Lee .................... H04M 1/0237 455/556.1 |
| 2015/0264162 A1 | 9/2015 | Peng |
| 2016/0182697 A1* | 6/2016 | Fields .................... G10K 11/08 381/300 |
| 2017/0126979 A1* | 5/2017 | Evans, V ............. H04N 5/2254 |
| 2018/0007182 A1 | 1/2018 | Lin |
| 2019/0014201 A1 | 1/2019 | Bao |

FOREIGN PATENT DOCUMENTS

| | | | |
|---|---|---|---|
| CN | 107483779 A | 12/2017 | |
| CN | 207968573 U | 10/2018 | |
| EP | 3255867 A1 | 12/2017 | |
| WO | WO-2019015651 A1 * | 1/2019 | ........... H04N 5/2257 |

OTHER PUBLICATIONS

European search report for Application No. EP18210847.2, dated Feb. 28, 2019 (7 pages).

* cited by examiner

MOBILE TERMINAL AND ELECTRONIC APPARATUS

CROSS-REFERENCE TO RELATED APPLICATIONS

This application claims priority to Chinese Patent Application No. 201820234928.X, filed on Feb. 9, 2018, the contents of which are herein incorporated by reference in their entireties.

FIELD

The described embodiments relate to electronic technology, and more particularly, to a mobile terminal and an electronic apparatus.

BACKGROUND

Existing mobile terminals, such as mobile phones, tablet computers, etc., usually have electronic devices such as a front camera assembly, a loudspeaker assembly, and a light sensor on a front top side of the mobile terminal. In order to pursue a better visual experience, a full screen mobile phone has become a new trend in the development of mobile phones. However, the front camera assembly, the loudspeaker assembly, and the light sensor and other electronic devices on the front top side of existing full screen mobile phones may occupy a part of area of a front face of the mobile terminal. Therefore, the increase in a screen-to-body ratio of mobile phone may be limited.

SUMMARY

A mobile terminal includes a housing. The housing includes a front side face, a rear side face away from the front side face, a left side face and a right side face opposite to each other, a top end face. The housing further includes a mother board arranged into the housing, a first display screen coupled to the mother board and arranged on the front side face of the housing, and a mounting frame. A first camera is arranged on the mounting frame, and the first camera is coupled to the mother board. The mounting frame is configured to extend itself out of the storage groove to expose the first camera or retract itself into the storage groove to hide the first camera into the housing. A storage groove is defined on the top end face of the housing. The storage groove is located between the front side face and the rear side face and extends to the left side face and the right side face to penetrate the left side face and the right side face of the housing.

A mobile terminal includes a housing. The housing includes a front shell, a back shell connected to the front shell, a screen embedded in the front shell and having a display area, a frame including a pair of spaced and parallel walls engaged with the front and back shells to define a chamber. The frame has a top connected with the walls and lower than tops of the front and back shells such that a storage space is defined by a top of the frame and the front and back shells. The chamber and the storage space are divided by the top of the housing. The housing further includes a mother board received in the chamber, a slidable device received in the storage space. The slidable device is configured to move between a first position at which the slidable device extends out of the storage space and a second position at which the slidable device retracts into the storage space. A camera is arranged on the slidable device and is connected with the mother board. When the slidable device is at the first position, the camera is exposed out of the storage space. When the slidable device is at the second position, the slidable device is covered by the display area and the camera is received in the storage space. The housing further includes a driving mechanism connected to the mother board. The driving mechanism is received in the chamber and is configured to drive the slidable device with the camera to move between the first position and the second position. The slidable device includes a pair of flanges at two opposite faces. When the slidable device is in the second position, the flanges engage with the tops of the front and back shells.

An electronic apparatus includes a housing. The housing includes a pair of spaced and parallel walls and a top connected with the walls, and a first screen engaged with the walls to define a chamber. The first screen has a top extending beyond the top of the housing such that a storage space is defined by the top of the housing and the first screen. The housing further includes a mother board received in the chamber; and a slidable device received in the storage space. The slidable device is configured to move between a first position at which the slidable device extends out of the storage space and a second position at which the slidable device retracts into the storage space. A camera is arranged on the slidable device and is connected with the mother board. When the slidable device is at the first position, the camera is exposed out of the storage space. When the slidable device is at the second position, the slidable device is covered by the display area and the camera is received in the storage space. A second screen having a top is higher than the top of the housing. The first and second screens and the top of the housing cooperatively define the storage space.

BRIEF DESCRIPTION OF THE DRAWINGS

In order to clearly illustrate the technical solutions of the present disclosure, the drawings used in the description of the embodiments will be briefly described. It is understood that the drawings described herein are merely some embodiments of the present disclosure. Those skilled in the art may derive other drawings from these drawings without inventive effort.

DETAILED DESCRIPTION

Figure 1:
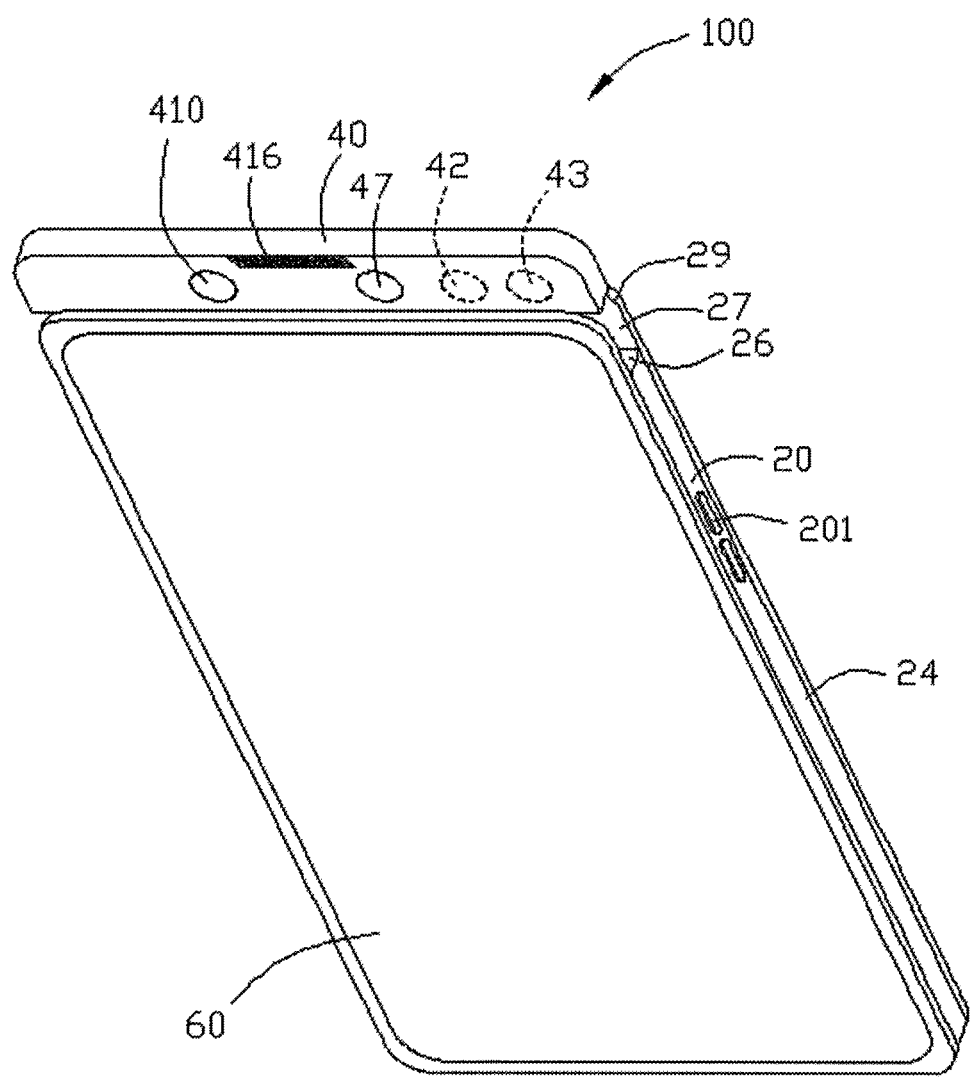
FIG. 1 is a perspective assembly view of a mobile terminal in accordance with an embodiment in the present disclosure.

The detailed description set forth below is intended as a description of the subject technology with reference to the appended figures and embodiments. It is understood that the embodiments described herein include merely some parts of the embodiments of the present disclosure, but do not include all the embodiments. Based on the embodiments of the present disclosure, all other embodiments that those skilled in the art may derive from these embodiments are within the scope of the present disclosure.

In the specification of the present disclosure, it is to be understood that terms such as "front", "rear", "left", "right", "inner", "outer", "top", and "bottom" refer to the orientations and locational relations illustrated in the drawings, and for describing the present disclosure and for describing in a simple manner, and which are not intended to indicate or imply that the device or the elements are disposed to locate at the specific directions or are structured and performed in the specific directions, which could not to be understood as limiting the present disclosure.

Figure 2:
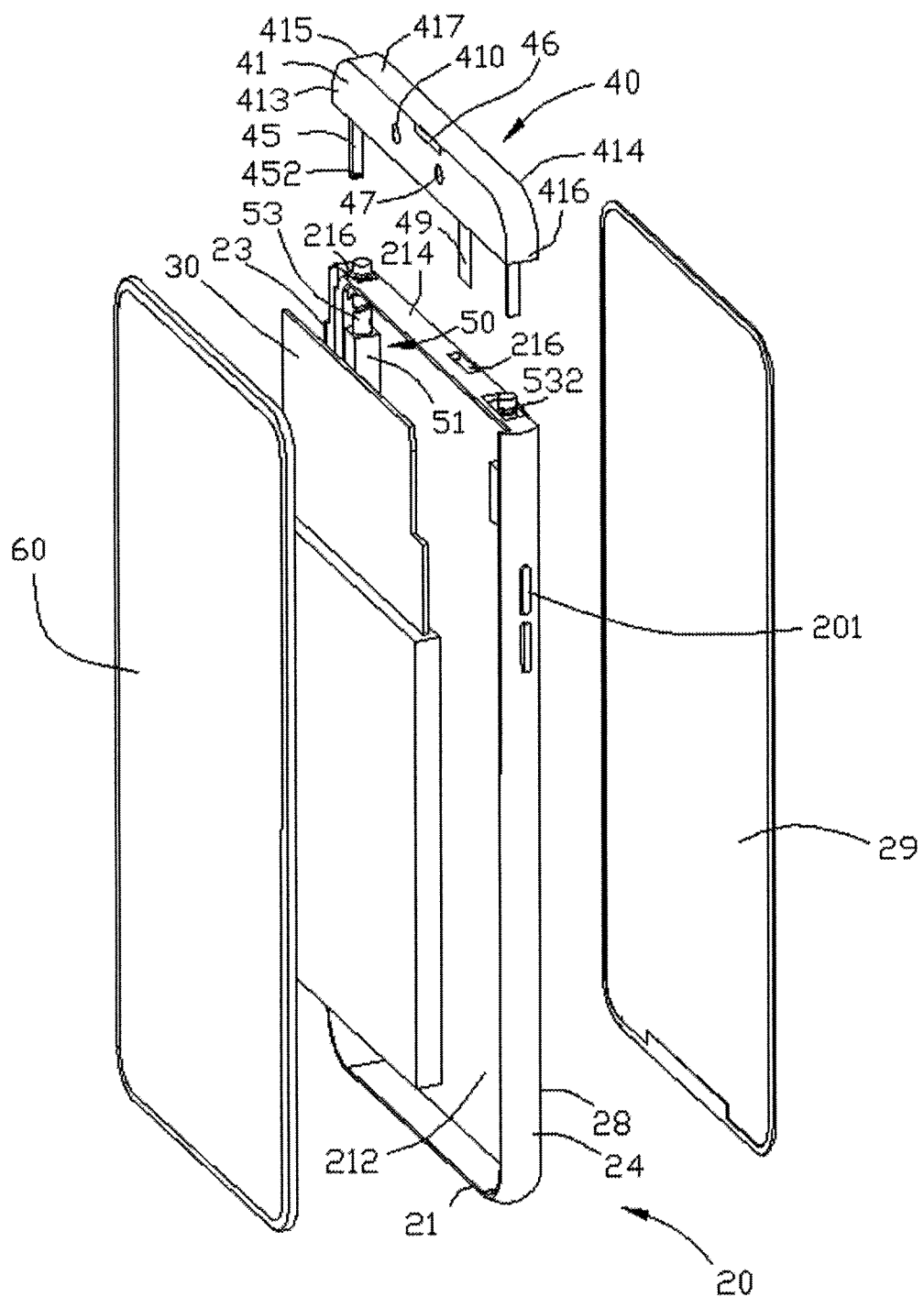
FIG. 2 is an exploded view of FIG. 1, shown from another view.
Figure 3:
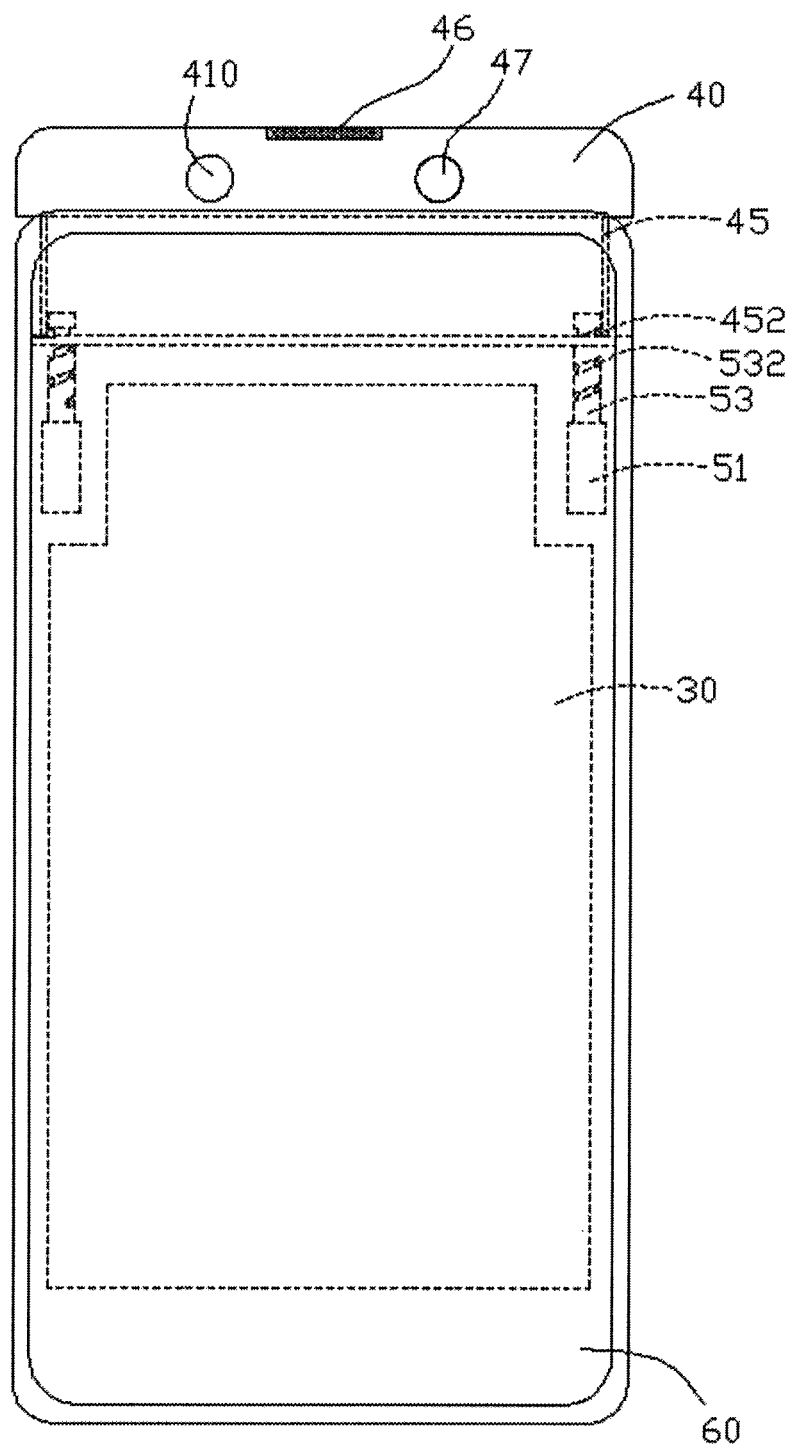
FIG. 3 is a front view of a mobile terminal in accordance with an embodiment in the present disclosure.

Referring to FIGS. 1 to 3. FIG. 1 is a perspective assembly view of a mobile terminal in accordance with an embodiment in the present disclosure. FIG. 2 is an exploded view FIG. 1, shown from another view. FIG. 3 is a front view of a mobile terminal in accordance with an embodiment in the present disclosure. The present disclosure provides a mobile terminal 100, which may include a housing 20, a mother board 30 arranged into the housing 20, and a first display screen 60 coupled to the mother board 30. The housing 20 may include a front side face 21, a rear side face 28 away from the front side face 21, a left side face 23 and a right side face 24 opposite to each other, and a top end face 26. The first display screen 60 may be arranged on the front side face 21 of the housing 20. A storage groove 27 may be defined on the top end face 26 of the housing 20. The storage groove 27 may be located between the front side face 21 and the rear side face 28, and may extend to the left side face 23 and the right side face 24 to penetrate the left side face 23 and the right side face 24 of the housing 20. The mobile terminal 100 may further include a mounting frame 40, a first camera 410 arranged on the mounting frame 40 and also coupled to the mother board 30. The mounting frame 40 may be driven by a driving device 50, to extend itself out of the storage groove 27 to expose the first camera 410 or retract itself into the storage groove 27 to hide the first camera 410 into the housing 20. When the first camera 410 extends out of the storage groove 27 and exposes from the housing 20, a lighting face of the first camera 410 may be not blocked by other devices of the mobile terminal 100. In this embodiment, the mobile terminal 100 may be a mobile phone. In other embodiments, the mobile terminal may be, but may not be limited to, a satellite or a cellular phone; a personal communication system (PCS) terminal that can combine cellular radiotelephone with data processing, fax, and data communication capabilities. The mobile terminal may include a radiotelephone, a pager, an internet/intranet access, a web browser, a notepad, a calendar, and/or a global positioning system (GPS) receiver personal digital assistant (PDA), and a conventional laptop, and/or a palmtop receiver or other mobile terminals including radiotelephone transceivers.

In this embodiment, the housing 20 may be a middle frame of the mobile terminal 100, and the storage groove 27 may be defined on the top end face of the middle frame and may penetrate the left side face and the right side face of the middle frame. The first display screen 60 may be electrically and signally coupled to the mother board 30, and the first camera 410 may be electrically and signally coupled to the mother board 30. In the present disclosure, the front side face of the housing 20 may refer to a side face facing the first display screen 60, and the rear side face of the housing 20 may refer to a side face facing away from the first display screen 60.

In the mobile terminal 100 provided by the present disclosure, the storage groove 27 may be defined on the top end face 26 of the housing 20 and the back of the first display screen 60. The driving device 50 may drive the mounting frame 40 to extend itself out of the storage groove 27 to expose the first camera 410 or retract itself into the storage groove 27 to hide the first camera 410 into the housing 20, i.e., when it is necessary to use the first camera 410, the driving device 50 may drive the mounting frame 40 to extend itself out of the storage groove 27 for a convenient use by a user; when it is not necessary to use the first camera 410, the driving device 50 may drive the mounting frame 40 to retract itself into the storage groove 27. Because the first camera 410 may be arranged on the mounting frame 40, and the mounting frame 40 may be retracted into the storage groove 27, the first camera 410 may not occupy an area of the first display screen 60 of the mobile terminal 100, thereby the screen-to-body ratio of the mobile terminal 100 may be more than 85%, and even more than 95%, the visual experience may be improved. In addition, when a user wants to use the first camera 410 of the mobile terminal 100, the mounting frame 100 has to extend itself out of the storage groove 27. It may prevent other users from maliciously controlling the first camera 410 of the mobile terminal 100 to take photographs of the user of the mobile terminal 100, thereby privacy of the user of the mobile terminal may not be inadvertently leaked, so that the safety of the mobile terminal 100 may be improved.

A back plate 29 may be arranged on the rear side face 28 of the housing 20. The storage groove 27 defined on the top end face 26 of the housing 20 may be located between the first display screen 60 and the back plate 29. In this embodiment, the back plate 29 may be detachably coupled to the housing 20, and a top end face of the back plate 29 may be aligned with a top end face of the first display screen 60. A front side face of the storage groove 27 may extend to a rear side face of the first display screen 60, and a rear side face of the storage groove 27 may extend to a front side face of the back plate 29.

In other embodiments, the housing may be integrally formed by the middle frame and the back plate. The top end face of the housing may define a storage groove extending to the left side face of the housing in a left direction and extending to the right side face of the housing in a right direction. The storage groove may or may not extend to the front side face of the housing. When the storage groove extends to the front side of the housing, a display screen on the front side of the housing and the housing may define the storage groove that may store the mounting frame 40; when the front side of the storage groove does not extend to the front side of the housing, the top end face of the housing may define the storage groove, i.e., when the mounting frame 40 is stored in the storage groove, the first camera 410 may be hidden behind the display screen.

In this embodiment, the back plate 29 may be a second display screen arranged on the rear side face 28 of the housing 20, and the second display screen may be entire or a part of the back plate 29. The second display screen may be coupled to the mother board 30, i.e., the mobile terminal 100 may be a double-sided screen mobile phone. A front side of the storage groove 27 may extend to the front side face 21 of the housing 20, and a back side of the storage groove 27 may extend to the rear side face 28 of the housing 20. A top end face of the second display screen may be aligned with a top end face of the first display screen 60. The storage groove 27 defined on the top end face of the housing 20 may be located between the first display screen 60 and the second display screen. The mounting frame 40 may be slidably stored in the storage groove 27 in a direction parallel to the first display screen 60. The second display screen may be electrically and signally coupled to the mother board 30.

An operation button 201 may be further arranged on the right side face 24 of the housing 20, which may be configured to control the driving device 50, i.e., the driving device 50 drive the mounting frame 40 to extend itself out of the storage groove 27 or retract itself into the storage groove 27 when the operation button 201 is pressed. In this embodiment, a number of the operation buttons 201 may be two, and the two operation buttons 201 may be coupled to the mother board 30. One of the operation buttons 201 may control the driving device to drive the mounting frame 40 to extend itself out of the storage groove 27; and the other operation button 201 may control the driving device to drive the mounting frame 40 to retract itself into the storage groove 27. Both the two operation buttons 201 may be electrically and signally coupled to the mother board 30.

A storage space 212 may be defined in a middle portion of the housing 20, which may be configured to store electronic devices such as the mother board 30 and a battery. A connecting plate 214 may be arranged on the housing 20, and the connecting plate 214 may be located between the storage space 212 and the storage groove 27, i.e., the connecting plate 214 may be a bottom plate of the storage groove 27. A number of through holes 216 may be defined on the connecting plate 214, and extend to the storage space 212.

The mounting frame 40 may include a mounting box 41 and at least one connecting component 45 coupled to the mounting box 41. The mounting box 41 may be configured to install other electronic devices such as a camera, a loudspeaker, a flash, and fingerprint recognition. The mounting box 41 may include a front side face 413 facing the first display screen 60, a rear side face 414 facing the second display screen, a left side face 415 and a right side face 416 opposite to each other, and a top end face 417. The first camera 410 may be arranged on the front side face 413. A second camera 42 and a flash 43 may be arranged on the rear side face 414 of the mounting box 41 and may be coupled to the mother board 30. A loudspeaker 46 and a photosensitive device 47 may be further arranged on the front side 413 of the mounting box 41 and may be coupled to the mother board 30. The first camera 410, the second camera 42, the flash 43, the loudspeaker 46, and the photosensitive device 47 may be all misaligned on the mounting box 41, i.e., these electronic devices may not overlap in a direction toward the front side face 413 in the mounting box 41, and it may reduce a thickness of the mounting frame 40, thereby an overall thickness of the mobile terminal 100 may be reduced. The first camera 410, the second camera 42, the flash 43, the loudspeaker 46, and the photosensitive device 47 may be coupled to the mother board 30 via one of the through holes 216 of the housing 20 by a data line 49, thereby these electronic devices may be coupled to the mother board 30. In this embodiment, the loudspeaker 46 may be located at top of the first camera 410, i.e., the loudspeaker 46 may be adjacent to the top end face 417 of the mounting box 41. The second camera 42, the flash 43, the loudspeaker 46, and the photosensitive device 47 may be electrically and signally coupled to the mother board 30.

In this embodiment, a number of at least one connecting component 45 may be two. One of the connecting components 45 may be arranged at left of a bottom end face of the mounting box 41, and the other connecting components 45 may be arranged at right of the bottom end face of the mounting box 41. Each of the connecting components 45 may include an extending bar extending outward from the bottom end face of the mounting box 41, and a block 452 may be arranged on an end of extending bar away from the mounting box 41. The driving device 50 may include two driving components 51 fixed in the housing 20 and coupled to the mother board 30, and a transmission component 53 is arranged on each driving component 51. Each of the transmission components 53 may be a transmission rod extending along a direction that the mounting frame 41 extends itself out of the storage groove 27 or retract itself into the storage groove 27, and may pass through via the corresponding through hole 216. A spiral groove 532 may be defined on the transmission rod and extend along the direction that the mounting frame 41 extends itself out of the storage groove 27 or retracts itself into the storage groove 27. Each of the blocks 452 on the connecting components 45 may be slidably engaged with the spiral grooves 532 defined on the two transmission rods. The two driving components 51 may respectively drive the two transmission components 53 to rotate, so that the block 452 of each connecting component 45 may slide along the corresponding spiral groove 532, so that each connecting component 45 may extend from or back into its corresponding through hole 216, to drive the mounting box 41 to extend itself out of the storage groove 27 or retract itself into the storage groove 27. The two driving components 51 may be electrically and signally coupled to the mother board 30.

Figure 4:
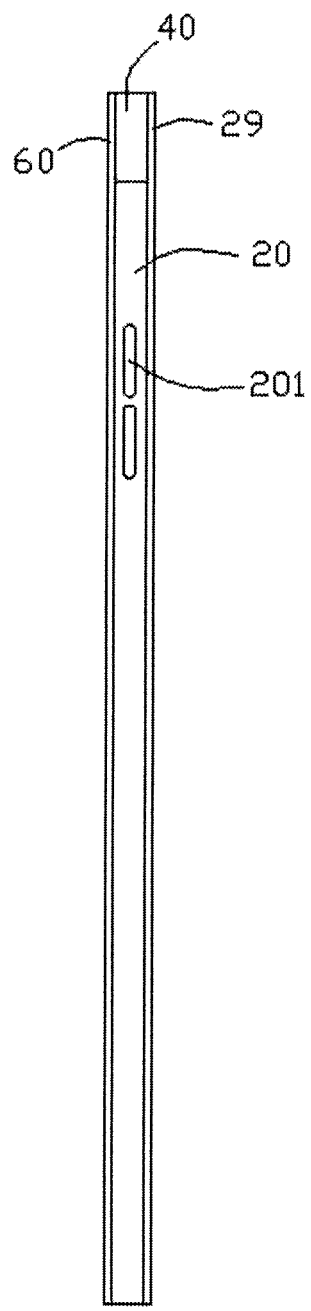
FIG. 4 is a side view of a mobile terminal in accordance with an embodiment in the present disclosure.
Figure 5:
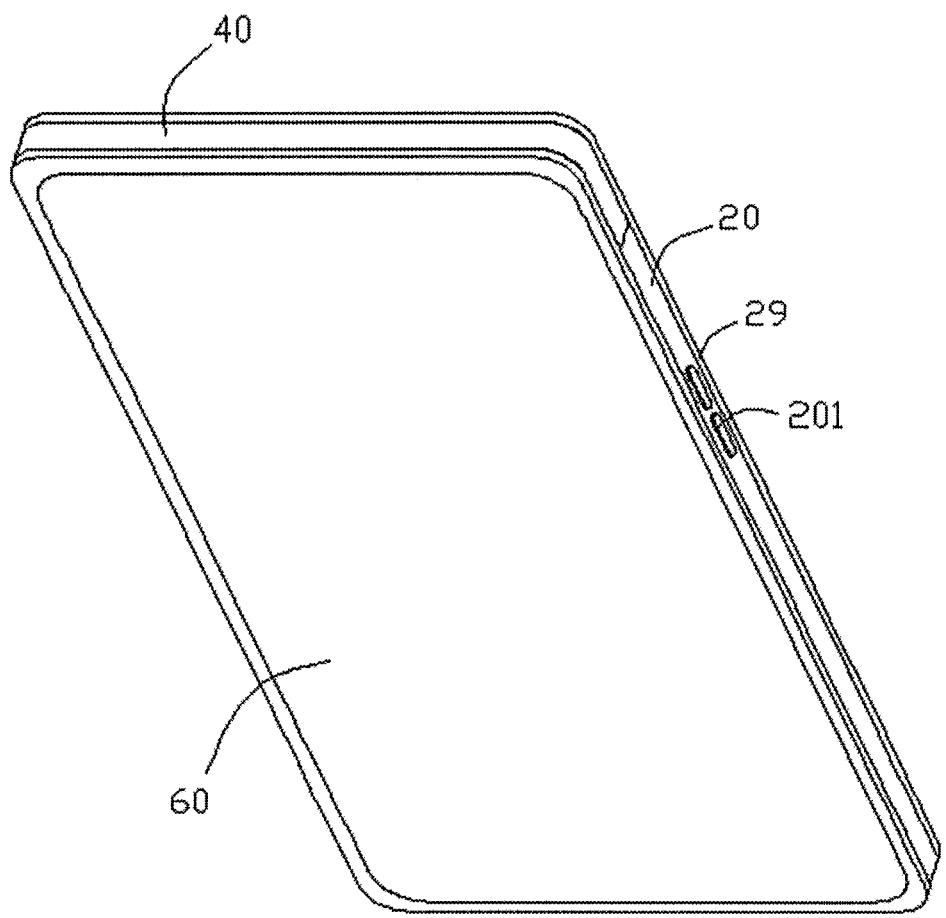
FIG. 5 is a perspective assembly view of a mobile terminal in accordance with an embodiment in the present disclosure, wherein the mobile terminal is in one state when it is used.

Referring to FIGS. 1-5. FIG. 4 is a side view of a mobile terminal in accordance with an embodiment in the present disclosure. FIG. 5 is a perspective assembly view of a mobile terminal in accordance with an embodiment in the present disclosure, wherein the mobile terminal is in one state when it is used. When a user wants to use the first camera 410 or the second camera 42 for photographing or when a user wants to use the loudspeaker 46 to answer a call, the operation button 201 may be pressed to send a trigger signal to a controller on the mother board 30. When the controller receives the trigger signal, the controller may control the two driving components 51 to drive each of the transmission components 53 to rotate, so that the block 452 of each connecting component 45 may slide along the corresponding spiral groove 532, so that each connecting component 45 may extend from its corresponding through hole 216, to drive the mounting box 41 to extend itself out of the storage groove 27. Until the first camera 410 and the loudspeaker 46 are exposed from the top end face of the housing 20 and the second camera 42 is exposed from the top end face of the housing 20, the two driving components 51 may stop driving each of the transmission components 53 to rotate. The mounting box 41 may be fixed outside the housing 20 to facilitate to use electronic devices such as the first camera 410, the second camera 42, or the loudspeaker 46.

When a user wants to store the mounting box 41, the operation button 201 may be pressed to send a trigger signal to a controller on the mother board 30. When the controller receives the trigger signal, and the controller may control the two driving components 51 to drive each of the transmission components 53 to rotate inversely, so that the block 452 of each of the connecting component 45 may slide along the corresponding spiral groove 532, so that each of the connecting components 45 may insert into its corresponding through hole 216, to drive the mounting box 41 to retract itself into the storage groove 27. Until the first camera 410, the second camera 42 and the loudspeaker 46 are both hidden in the storage groove 27, the two driving components 51 may stop driving each of the transmission components 53 to rotate. In this case, the mounting box 41 may be fixed inside the storage groove 27. A left side face 415 of the mounting box 41 may be aligned with the left side face 23 of the housing 20; a right side face 416 of the mounting box 41 may be aligned with the right side face 24 of the housing 20; and a top end face 417 of the mounting box 41 may be aligned with a top end face of the first display screen 60.

In the present disclosure, the storage groove 27 may be defined on the top end face 26 of the housing 20. The storage groove 27 may be located between the first display screen 60 and the second display screen. The mounting box 41 may be slidably stored in the storage slot 27. The controller on the mother board 30 may control the driving device 50 to drive the mounting box 41 to extend itself out of the storage groove 27 or retract itself into the storage groove 27, so that electronic devices such as the first camera 410, the second camera 42, the flash 43, the loudspeaker 46, and the photosensitive device 47 on the mounting box 41 may be exposed out of the storage groove 27 or hidden in the storage groove 27. Because the electronic devices may be arranged on the mounting box 41, an area of the electronic devices may be not occupied an area of the first display screen 60 and the second display screen of the mobile terminal 100, so that the screen-to-body ratio of the mobile terminal 100 may be improved.

In other embodiments, the operation button may be icon displayed on the first display screen 60 or the second display screen. When the icon is touched, a trigger signal may be sent to a controller on a mother board. The controller may receive the trigger signal and control the two driving components 51 to drive each of the transmission components 53 to rotate.

In other embodiments, the operation button may be a telephone answering button arranged on the first display screen 60 or the second display screen. When the telephone answering button is touched to get through a call, a trigger signal may be sent to a controller on the mother board by clicking the icon, and the controller may receive the trigger signal and control the two driving components 51 to drive each of the transmission components 53 to rotate. When the telephone answering button is touched to cut off a call, a trigger signal may not be sent to a controller on the mother board by clicking the icon, and the controller may receive the trigger signal and control the two driving components 51 to drive each of the transmission components 53 to rotate.

In other embodiments, a gap may be defined on the top end face 417 of the mounting box 41 adjacent to the loudspeaker 46, and the gap may extend to the loudspeaker 46. When the mobile terminal 100 get through a call, the gap may be configured to transmit sound from the loudspeaker 46 without extending the mounting box 41 out of the storage groove 27.

Figure 6:
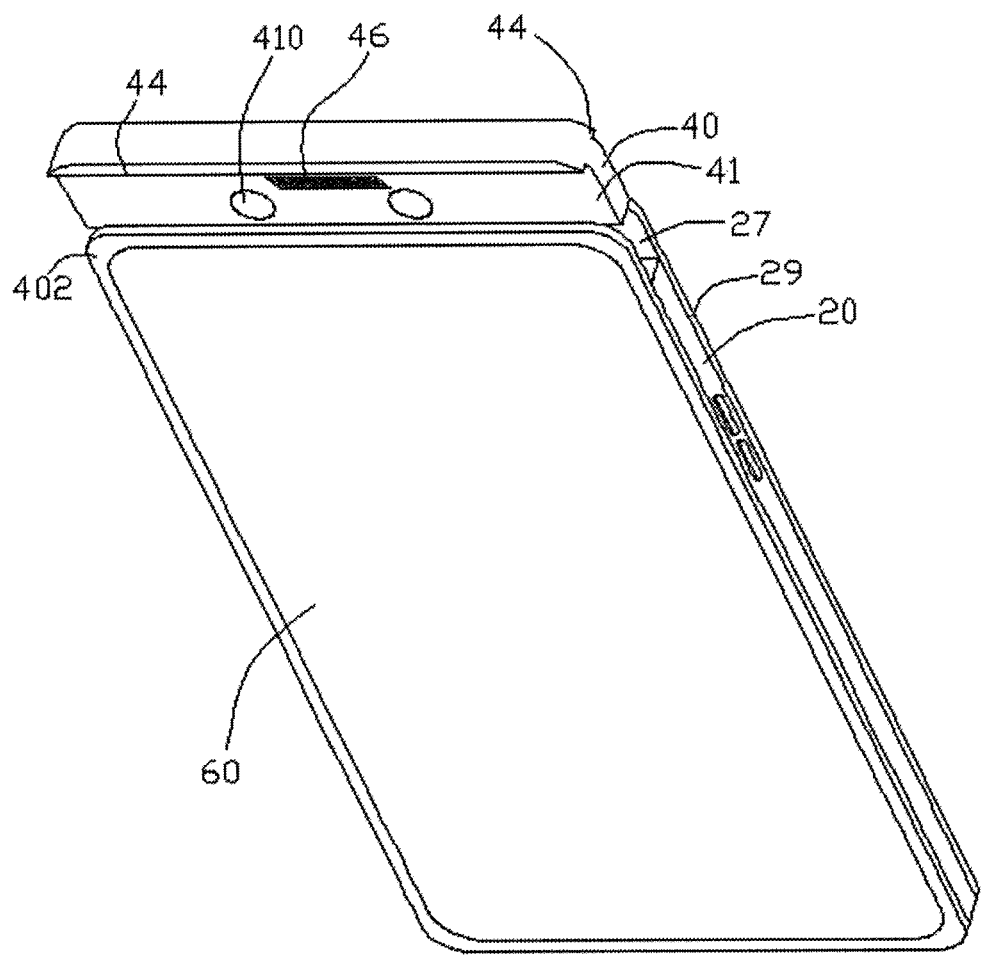
FIG. 6 is a perspective assembly view of a mobile terminal in accordance with an embodiment in the present disclosure.
Figure 7:
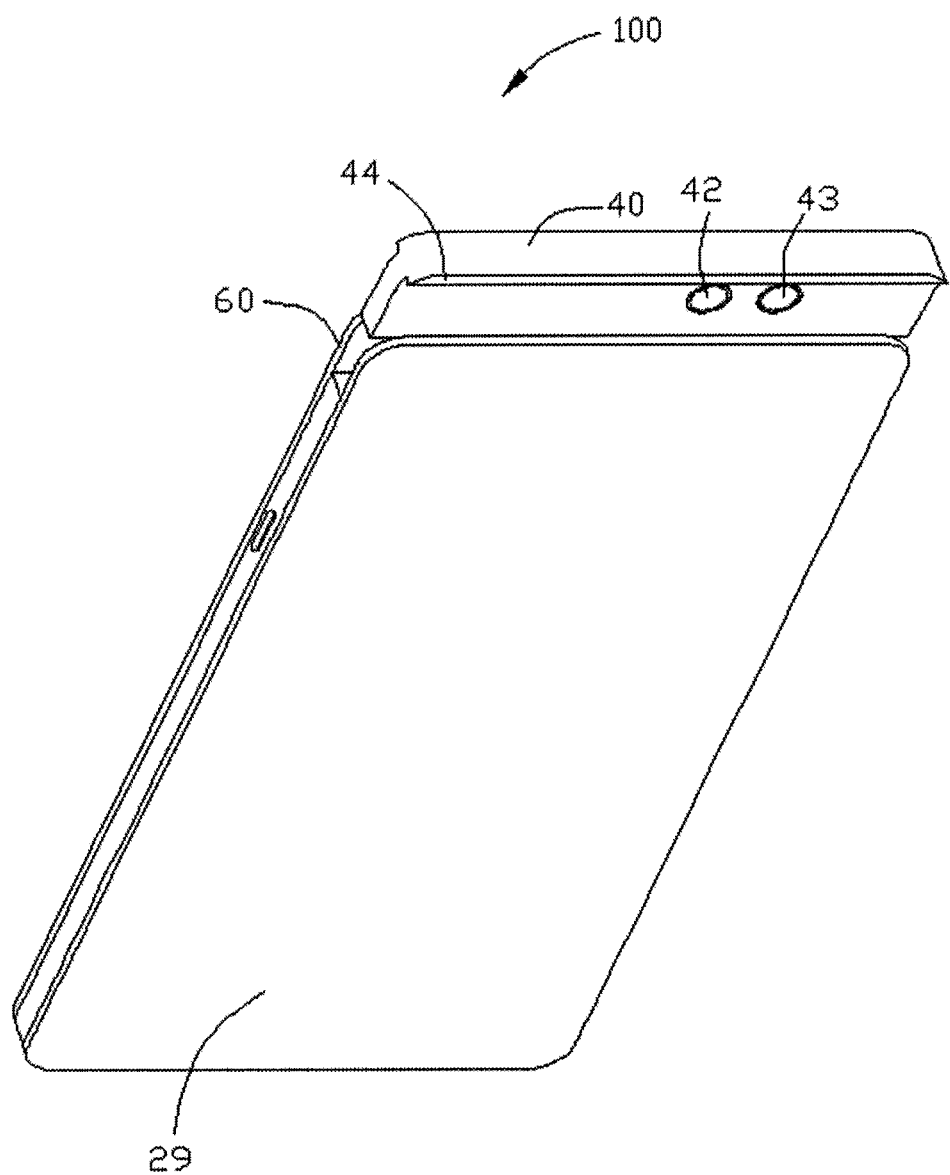
FIG. 7 is a perspective assembly view of FIG. 6, shown from another view.
Figure 8:
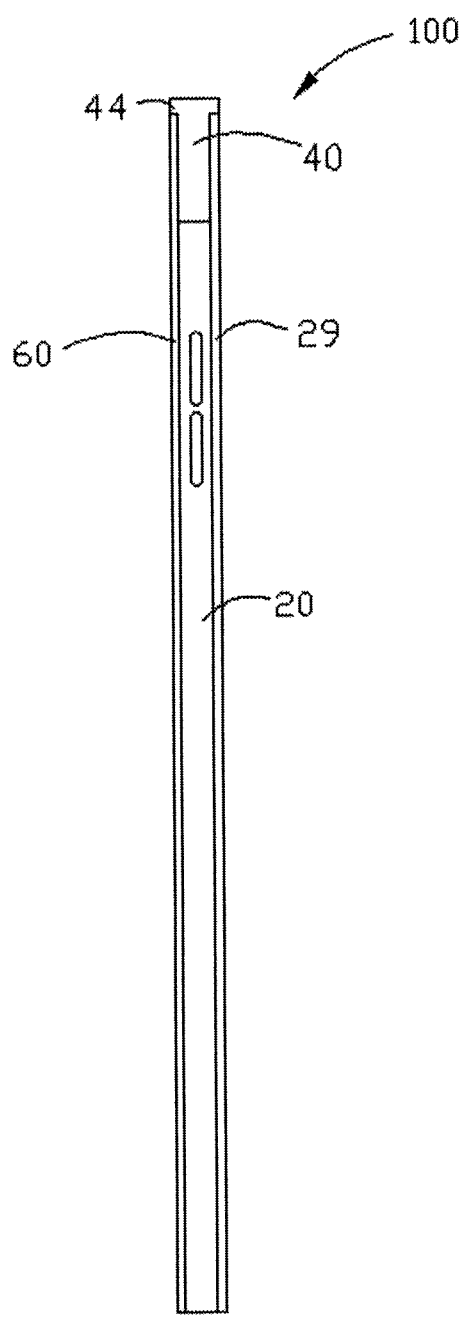
FIG. 8 is a side view of a mobile terminal in accordance with an embodiment in the present disclosure.

Referring to FIG. 6 to FIG. 8. FIG. 6 is a perspective assembly view of a mobile terminal in accordance with an embodiment in the present disclosure. FIG. 7 is a perspective assembly view of FIG. 6, shown from another view. FIG. 8 is a side view of a mobile terminal in accordance with an embodiment in the present disclosure. A structure of the mobile terminal in this embodiment may be similar to that of the above-mentioned embodiment, and the difference is that two baffles 44 may be arranged on the face of the mounting box 41 facing the first display screen 60 and facing away from the first display screen 60, and each of the baffle 44 may extend from the left side of the mounting box to the right side of the mounting box 41. When the mounting frame 40 is retracted into the storage groove 27, the two baffles 44 may be placed on the top end face of the first display screen 60 and on top end face of the back plate 29, respectively. Sides of the two baffles 44 away from the mounting box 41 may be respectively aligned with the front side face of the first display screen 60 and the rear side face of the back panel 29. The two baffles 44 arranged on the mounting box 41 may prevent partial dust from directly entering the mobile terminal. In addition, as an embodiment, the mounting box 41 may be manually pulled out of the storage groove 27 by grabbing the two baffles 44 outward, which may be convenient to use.

The loudspeaker 46 may be arranged on a lower side of the corresponding baffle 44. A gap may be defined on the corresponding baffle 44 adjacent to the loudspeaker 46, and the gap extends to the loudspeaker 46. When the mobile terminal 100 get through a call, the gap may be configured to transmit sound from the loudspeaker 46 without extending the mounting box 41 out of the storage groove 27.

A connecting frame 402 may be arranged around peripheral sides of the first display screen 60, and one of the baffles 44 may cover the connecting frame 402 at the top face of the first display screen 60. A gap may be defined on the connecting frame 402 adjacent to the loudspeaker 46, and the gap extends to the loudspeaker 46. When the mobile terminal 100 get through a call, the gap may be configured to transmit sound from the loudspeaker 46 without extending the mounting box 41 out of the storage groove 27.

Figure 9:
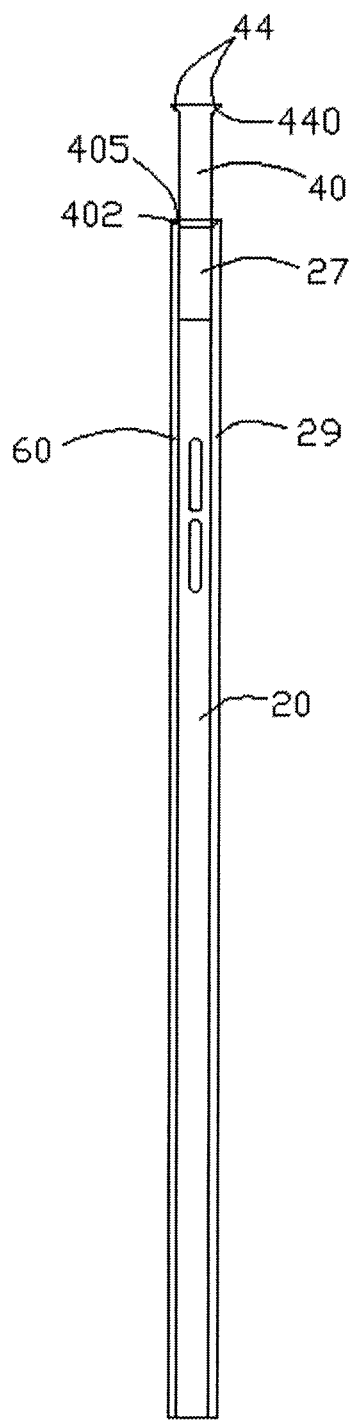
FIG. 9 is a side view of a mobile terminal in accordance with an embodiment in the present disclosure.
Figure 10:
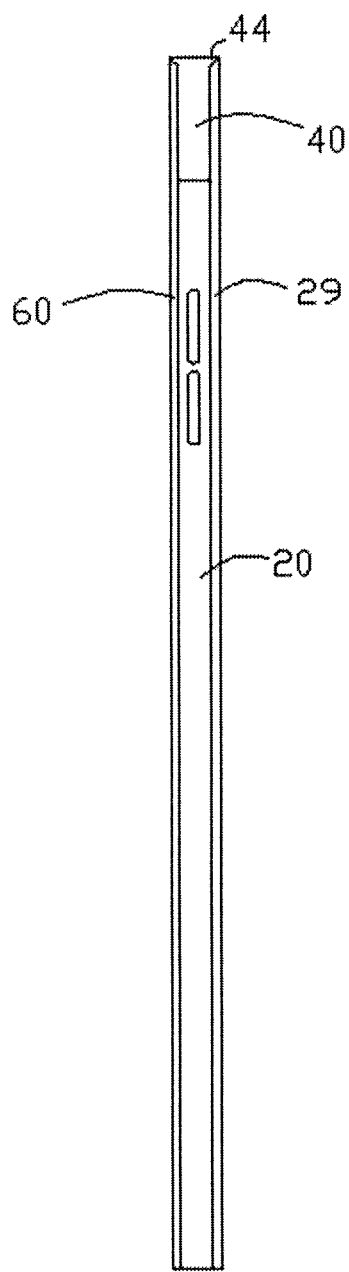
FIG. 10 is a perspective assembly view of a mobile terminal in accordance with an embodiment in the present disclosure, wherein the mobile terminal is in one state when it is used.

Referring to FIG. 9 and FIG. 10. FIG. 9 is a side view of a mobile terminal in accordance with an embodiment in the present disclosure. FIG. 10 is a perspective assembly view of a mobile terminal in accordance with an embodiment in the present disclosure, wherein the mobile terminal is in one state when it is used. A structure of the mobile terminal in this embodiment may be similar to that of the above-mentioned embodiment. In this embodiment, the difference is that two storage notches 405 may be defined on a top end face of the connecting frame 402 corresponding to a position of the baffle 44 and a top end face of the back panel 29 corresponding to a position of the baffle 44, respectively.

When the mounting frame 40 is retracted into the storage groove 27, the one of the two baffles 44 may be retracted into one of the two storage notch 405, respectively. It may not only prevent partial dust from directly entering the mobile terminal, but also may reduce the volume of the mobile terminal, so that a structure of the mobile terminal may be more reasonable. An inclined guiding face 440 may be arranged on a side of each baffle 44 facing to the corresponding storage notch 405. One end of the guiding face 440 may extend to the front side face of the mounting frame 40, and the other end of the guiding face 440 may extend to an edge on a top end face of the baffle 44 facing the first display screen 60. A sliding face fit to the guiding face 440 may be arranged on an inner wall of the storage notch 405.

Figure 11:
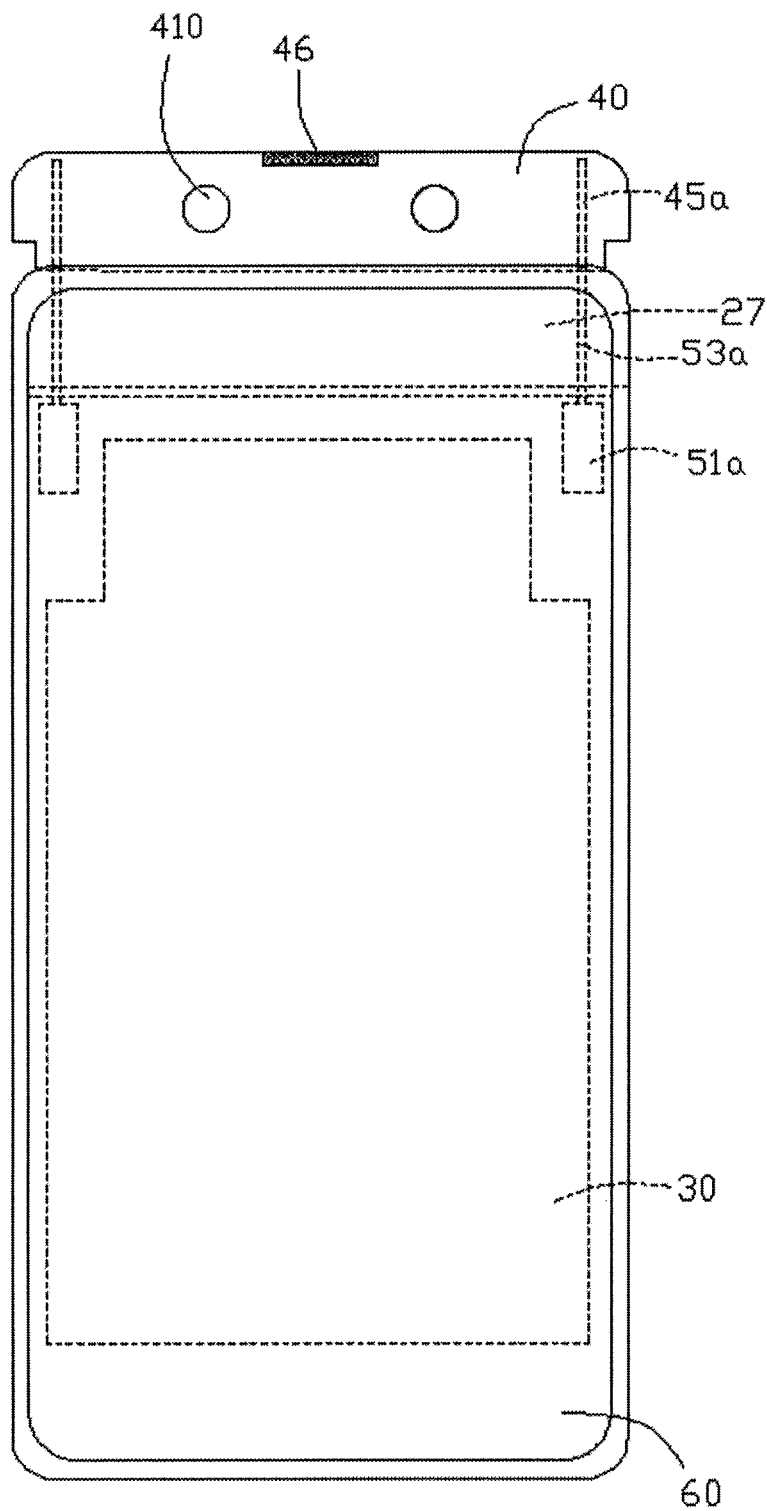
FIG. 11 is a perspective assembly view of a mobile terminal in accordance with an embodiment in the present disclosure.

Referring to FIG. 11. FIG. 11 is a perspective assembly view of a mobile terminal in accordance with an embodiment in the present disclosure. A structure of the mobile terminal in this embodiment may be similar to that of the above-mentioned embodiment. In this embodiment, the difference is that the driving device of the mobile terminal of this embodiment may be different from the driving device of the mobile terminal of the above-mentioned embodiment. In this embodiment, the driving device may include two motors 51*a* fixed in the housing 20 and coupled to the mother board 30, and a screw rod 53*a* respectively coupled to each of the motor 51*a*. Each of the screw rods 53*a* may extend along the direction that the mounting frame 40 extends itself out of the storage groove 27 or retract itself into the storage groove 27. Two screw holes 45*a* may be defined on the mounting frame 40, and each of the screw hole 45*a* may be respectively screwed to one of the screw rod 53*a*. The mother board 30 may control the two motors 51*a* to drive each of the corresponding screw rods 53*a* to rotate to drive the mounting frame 40, so that the mounting frame 40 may extend itself out of the storage groove 27 or retract itself into the storage groove 27. The two motors 51*a* may be electrically and signally coupled to the mother board 30.

In other embodiments, the driving device may include a motor 51*a* fixed in the housing 20 and coupled to the mother board 30, and a screw rod 53*a* coupled to the motor 51*a*. The screw rod 53*a* may extend along the direction that the mounting frame 40 extends itself out of the storage groove 27 or retract itself into the storage groove 27. A screw hole 45*a* may be defined on the mounting frame 40, and the screw holes 45*a* may be screwed to the two screw rods 53*a*. The mother board 30 may control the motors 51*a* may drive the screw rod 53*a* to rotate to drive the mounting frame 40, so that the mounting frame 40 may extend itself out of the storage groove 27 or retract itself into the storage groove 27.

Figure 12:
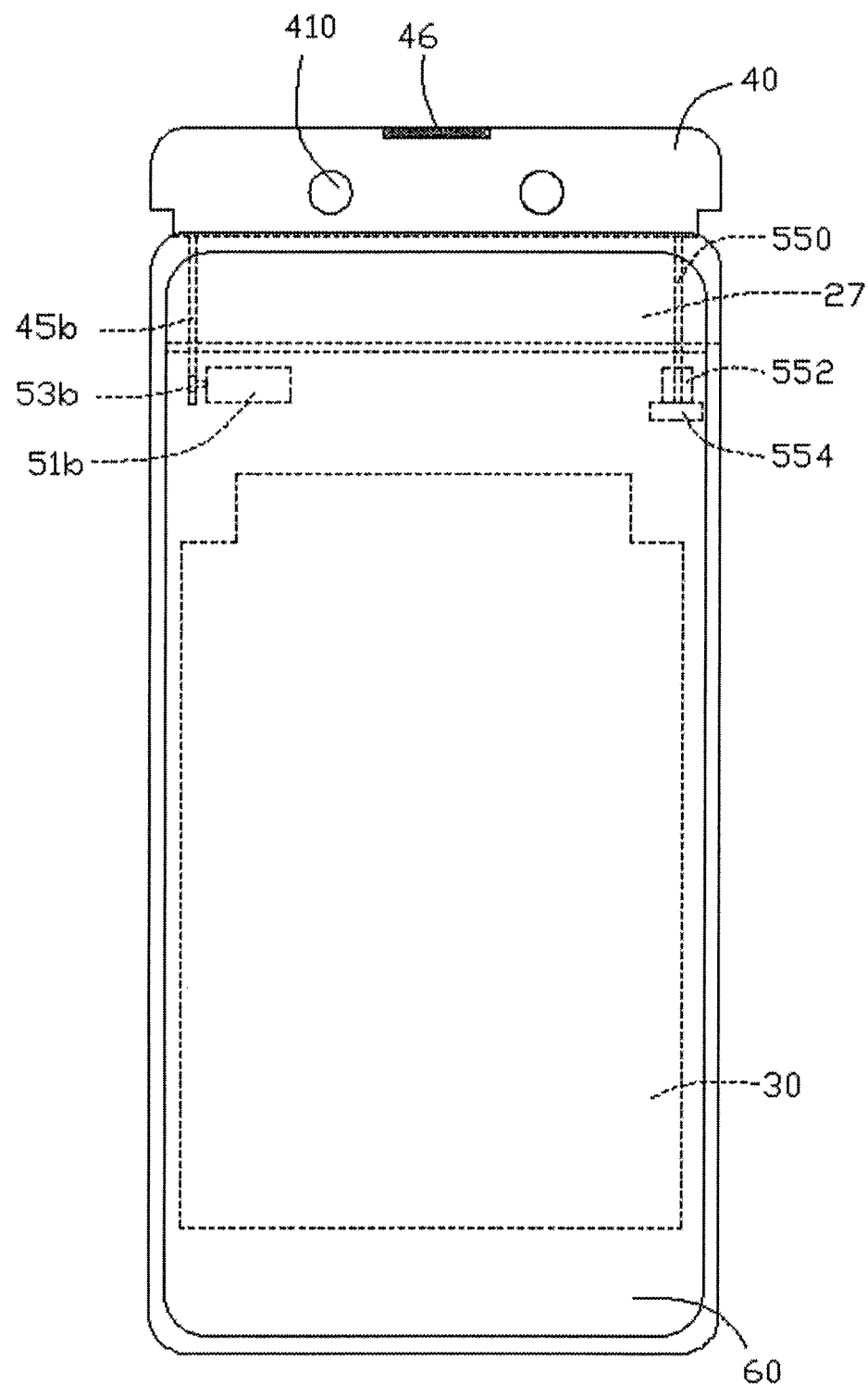
FIG. 12 is a perspective assembly view of a mobile terminal in accordance with an embodiment in the present disclosure.

Referring to FIG. 12. FIG. 12 is a perspective assembly view of a mobile terminal in accordance with an embodiment in the present disclosure. A structure of the mobile terminal in this embodiment may be similar to that of the above-mentioned embodiment. In this embodiment, the difference is that the driving device of the mobile terminal of this embodiment may be different from the driving device of the mobile terminal of the above-mentioned embodiment. In this embodiment, the driving device may include a motor 51*b* fixed in the housing 20 and coupled to the mother board 30, a driving gear 53*b* coupled to the motor 51*b*, and a rack 45*b* arranged on the mounting frame 40 and extending along the direction that the mounting frame 40 extends itself out of the storage groove 27 or retract itself into the storage groove 27. Teeth of the rack 45*b* and teeth of the driving gear 53*b* may be engaged. The motor 51*b* may drive the driving gear 53*b* to rotate, to drive the rack 45*b* to slide, so that the mounting frame 40 may extend itself out of the storage groove 27 or retract itself into the storage groove 27.

In this embodiment, a guide structure may be further arranged between the housing 20 and the mounting frame 40. The guide structure may include a guide rod 550 extending along the direction that the mounting frame 40 extends itself out of the storage groove 27 or retract itself into the storage groove 27, an alignment block 552 arranged in the housing 20 and corresponding to the guide rod 550, and a stopping block 554 arranged at an end of the guide rod 550 away from the mounting frame 40. A guiding hole may be defined on the alignment block 552 along the direction that the mounting frame 40 extends itself out of the storage groove 27. The guide rod 550 may be slidably inserted into the guiding hole. When the mounting frame 40 extends itself out of the storage groove 27, the guide rod 550 may slide along the guiding hole on the alignment block 552. The stopping block 554 may block the end of the guide rod 550 away from the mounting frame 40 to prevent the mounting frame 40 from separating from the housing 20.

Figure 13:
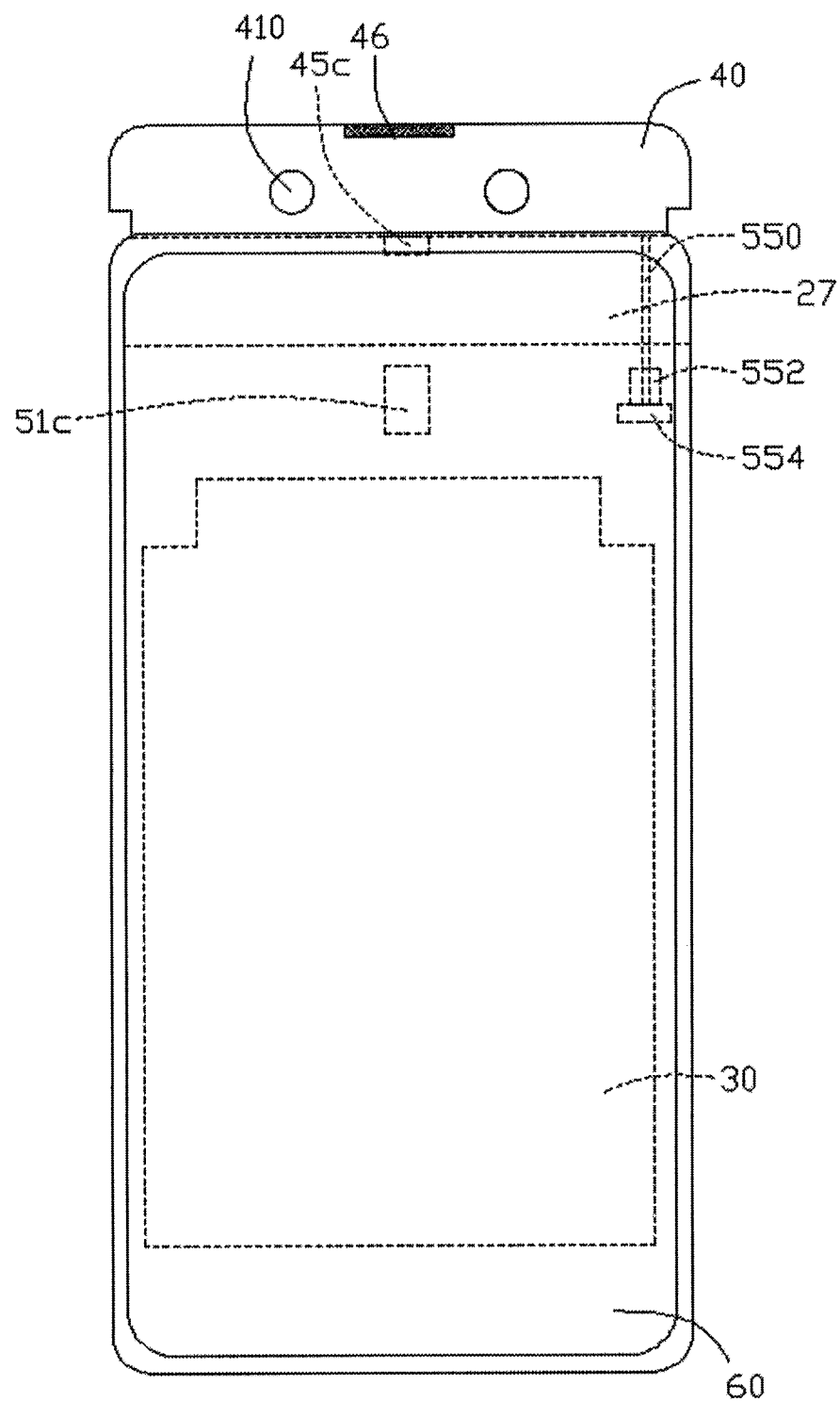
FIG. 13 is a perspective assembly view of a mobile terminal in accordance with an embodiment in the present disclosure.

Referring to FIG. 13. FIG. 13 is a perspective assembly view of a mobile terminal in accordance with an embodiment in the present disclosure. A structure of the mobile terminal in this embodiment may be similar to that of the above-mentioned embodiment. In this embodiment, the difference is that the driving device of the mobile terminal of this embodiment may be different from the driving device of the mobile terminal of the above-mentioned embodiment. In this embodiment, the driving device may include an electromagnet 51*c* fixed in the housing 20 and coupled to the mother board 30, and a magnet 45*c* arranged on the mounting frame 40 and corresponding to the electromagnet 51*c*. When it is necessary to extend the mounting frame 40 out of the storage groove 27, the mother board 30 may supply power to the electromagnet 51*c*. Magnetic poles between the electromagnet 51*c* and the magnet 45*c* may be same, and the electromagnet 51*c* and the magnet 45*c* may be mutually repelled, so that the mounting frame 40 may be driven to extend itself out of the storage groove 27. When it is necessary to store the mounting frame 40 into the storage groove 27, the mother board 30 may supply power to the electromagnet 51*c* and change the power supply direction. The magnetic poles between the electromagnet 51*c* and the magnet 45*c* may become different, and the electromagnet 51*c* and the magnet 45*c* may attract each other, so that the mounting frame 40 may be driven to retract itself into the storage groove 27.

When the mounting frame 40 extends itself out of the storage groove 27, the guide rod 550 may slide along the guiding hole on the alignment block 552. The stopping block 554 may block the end of the guide rod 550 away from the mounting frame 40 to prevent the mounting frame 40 from separating from the housing 20.

In other embodiments, the magnet 45*c* in this embodiment may also be replaced by an electromagnet electrically coupled to the mother board 30. The mother board 30 may supply power to the two electromagnets and may change the power supply direction. The magnetic poles between the two electromagnets may be the same or different, thereby the mounting frame 40 may be driven to extend itself out of the storage groove 27 or retract itself into the storage groove 27.

In other embodiments, the driving device may include a magnet fixed in the housing 20, and an electromagnet arranged on the mounting frame 40 and corresponding to the magnet. The electromagnet may be electrically coupled to the mother board 30. When the mother board 30 supplies power to the electromagnet, the magnetic poles between the magnet and the electromagnet may be same and mutually repelled to drive the mounting frame 40 to extend itself out of the storage groove 27. When the mother board 30 stops supplying power to the electromagnet, the mounting frame 40 may retract itself into the storage groove 27 by attracting an iron core of the electromagnet on the mounting frame 40 and the magnet on the housing 20.

Figure 14:
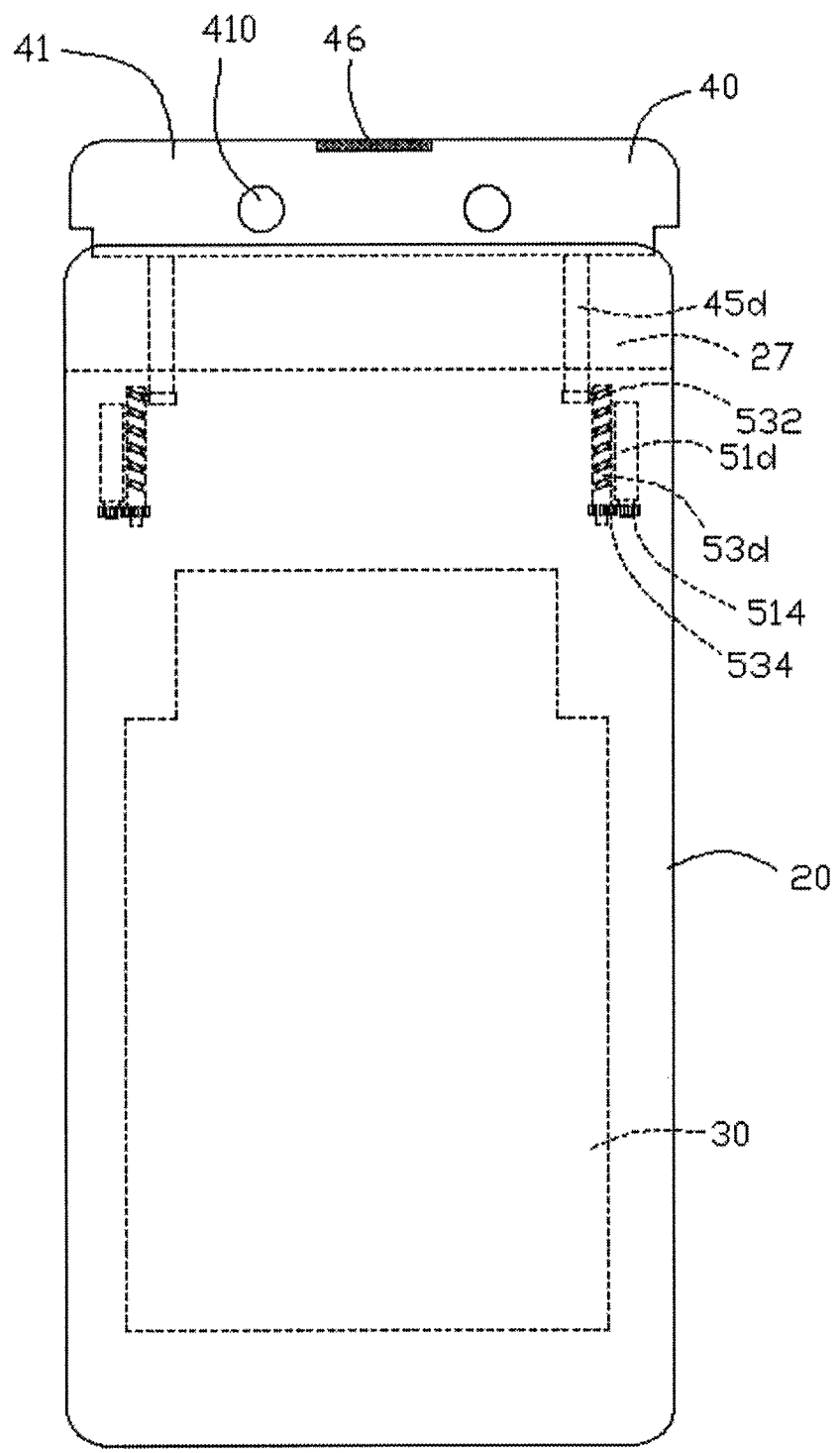
FIG. 14 is a perspective assembly view of a mobile terminal in accordance with an embodiment in the present disclosure.

Referring to FIG. 14. FIG. 14 is a perspective assembly view of a mobile terminal in accordance with an embodiment in the present disclosure. A structure of the mobile terminal in this embodiment may be similar to that of the above-mentioned embodiment. In this embodiment, the difference is that the driving device of the mobile terminal of this embodiment may be different from the driving device of the mobile terminal of the above-mentioned embodiment. In this embodiment, the driving device may include two motors 51*d* fixed in the housing 20 and coupled to the mother board 30, a driving gear 514 coupled to each of the motors 51*d*, a transmission rod 53*d* adjacent to each of the motor 51*d* and extending along the direction that the mounting frame 40 extends itself out of the storage groove 27 or retract itself into the storage groove 27, and a connecting rod 45*d* adjacent to each of the transmission rod 53*d* and sliding along the direction that the mounting frame 40 extends itself out of the storage groove 27 or retract itself into the storage groove 27. A driven gear 534 may be arranged on one end of each of the transmission rod 53*d*, and teeth of the driven gear 534 and teeth of the driving gear 514 on the motor 51*d* may be engaged. A spiral groove 532 may be defined on an outer peripheral face of each of the transmission rod 53*d* along the direction that the mounting frame 40 extends itself out of the storage groove 27 or retract itself into the storage groove 27. A top end of each of the connecting rod may be coupled to mounting box 41. A sliding block may be arranged slidably on a bottom end of each of the connecting rod 53*d*, and the sliding block may be configured to be engaged with the spiral groove 532 corresponding to the transmission rod 53*d*. The mother board 30 may control the two motors 51*d* to drive each of the corresponding driving gear 514 to rotate, to drive the driven gear 534 to rotate. Thereby, each of the transmission rods 53*d* may be rotated to drive the sliding block of the corresponding connecting rod 45*d* to slide along the corresponding spiral groove 532, so that the mounting frame 40 may extend itself out of the storage groove 27 or retract itself into the storage groove 27. The two motors 51*d* may be electrically and signally coupled to the mother board 30.

Figure 15:
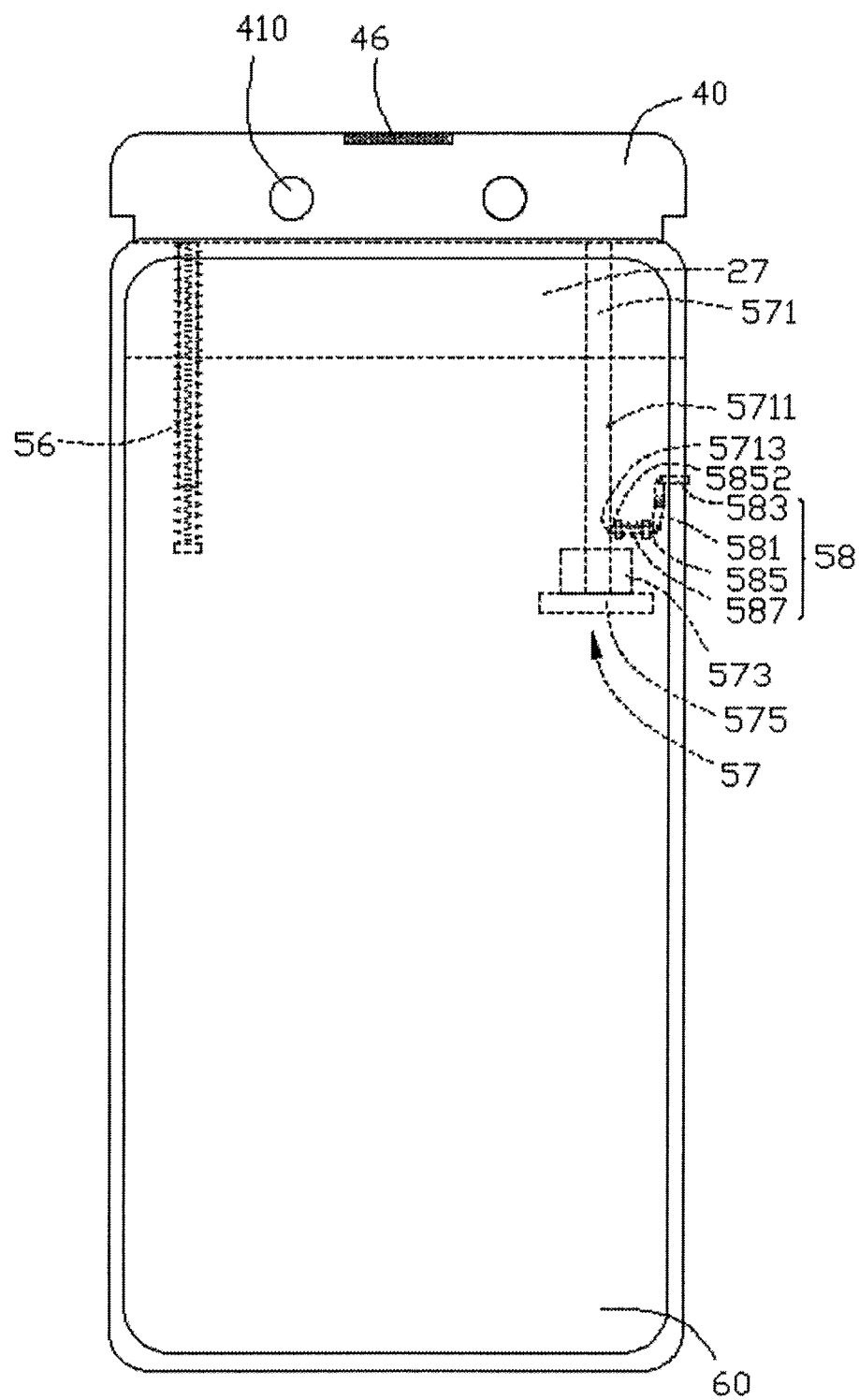
FIG. 15 is a perspective assembly view of a mobile terminal in accordance with an embodiment in the present disclosure.

Referring to FIG. 15. FIG. 15 is a perspective assembly view of a mobile terminal in accordance with an embodiment in the present disclosure. A structure of the mobile terminal in this embodiment may be similar to that of the above-mentioned embodiment. In this embodiment, the difference is that the driving device of the mobile terminal of this embodiment may be different from the driving device of the mobile terminal of the above-mentioned embodiment. In this embodiment, the driving device may include a first elastic component 56 elastically coupled between the housing 20 and the mounting frame 40, a guide structure 57 arranged between the mounting frame 40 and the housing 20, and an alignment structure 58 arranged on the housing 20. The first elastic component 56 may be configured to push the mounting frame 40 to extend out of the storage groove 27. In this embodiment, the first elastic component 56 may be a spring coupled between the mounting frame 40 and the housing 20. The guide structure 57 may include a guiding bar 571 arranged on the mounting frame 40 along the direction that the mounting frame 40 extends itself out of the storage groove 27 or retract itself into the storage groove 27, an alignment block 573 arranged in the housing 20 and corresponding to the guiding bar 571, and a stopping block 575 arranged at an end of the guiding bar 571 away from the mounting frame 40. A guiding hole may be defined on the alignment block 573 and may extend along the direction that the mounting frame extends itself out of the storage groove or retract itself into the storage groove, and the guide bar 571 may be slidably inserted into the guiding hole. The stopping block 575 may block the end of the alignment block 573 away from the mounting frame 40 to prevent the mounting frame 40 from separating from the housing 20. A first alignment slot 5711 may be defined in a peripheral wall of the guiding bar 571 adjacent to the mounting frame 40, and a second alignment slot 5713 may be defined in the peripheral wall of the guiding bar 571 away from the mounting frame 40. The alignment structure 58 may include a rotating component 581 rotatably coupled to the housing 20, a pressing component 583 rotatably coupled to one end of the rotating component 581, an alignment sliding block 585 rotatably coupled to the rotating component 581 away from the other end coupled to the pressing component 583; and an second elastic component 587 coupled to the alignment sliding block 585 and configured to force the alignment sliding block 585 to return its original position. A guiding face 5852 may be defined on the alignment sliding block 585 adjacent to one end of the guiding bar 571. The pressing component 583 may extend away from the end of the rotating component 581, to extend out of the housing 20 to form an operating button. The operating button pressing the pressing component 583 may drive the rotating component 581 to rotate, so that the rotating component 581 may drive the alignment sliding block 585 to slide out of the first alignment slot 5711 or the second alignment slot 5713. The second elastic component 587 may be elastically deformed.

When the mounting frame 40 is stored in the storage groove 27, the first elastic component 56 may be pressed to be elastically deformed between the mounting frame 40 and the housing 20. The end of the alignment sliding block 585 away from the rotating component 581 may be inserted into the first alignment slot 5711 to prevent the first elastic component 56 from pushing the mounting frame 40 out of the first alignment slot 5711.

When it is necessary to extend the mounting frame 40 out of the storage groove 27, the operation button of the pressing component 583 may be pressed to push the rotating component 581 to rotate. The rotating component 581 may drive the alignment sliding block 585 to slide away from the guiding bar 571 and may separate from a inserting with the first alignment slot 5711, so that the second elastic component 587 may be elastically deformed. The first elastic component 56 may be release its deformation to push the mounting frame 40 out of the storage groove 27, and the guiding bar 571 may slide along the guiding hole on the alignment block 573 until the mounting frame 40 is extended out of the storage groove 27. At this time, the stopping block 575 may stop at the alignment block 573 to prevent the mounting frame 40 from separating from the housing 20. When the alignment sliding block 585 faces the second alignment slot 5713, the second elastic component 587 may release its elastic deformation to push the second elastic component 587 to be inserted into the second alignment slot 5713, to align the mounting frame 40.

When it is necessary to store the mounting frame 40 into the storage groove 27, the mounting frame 40 may be pressed toward the storage groove 27 to slide the mounting frame 40 into the storage groove 27. An upper face of the second alignment slot 5713 on the guiding bar 571 may slidingly push against a sliding face 5852 on the guiding bar 571, so that the guiding bar 571 may slide away from the second alignment slot 5713 and may separate from a inserting with the guiding bar 571. The first elastic component 56 and the second elastic component 587 may be both elastically deformed. When the guiding bar 571 slides to the first alignment slot 5711 and faces the alignment sliding block 585, the second elastic component 587 may release its deformation, so that the alignment sliding block 585 may be inserted into the first alignment slot 5711 to align the mounting frame 40 to retract itself into the storage groove 27.

In this embodiment, by the first elastic component 56 elastically coupled between the housing 20 and the mounting frame 40, the guide structure 57 arranged between the mounting frame 40 and the housing 20, and the alignment structure 58 arranged on the housing 20, the mounting frame 40 may extend itself out of the storage groove or retract itself into the storage groove. The first camera 410 may not occupy an area of the first display screen 60 of the mobile terminal 100, thereby the screen-to-body ratio of the mobile terminal 100 may be increased, and energy consumption may be saved and a user's operation feeling may be improved.

Referring to FIG. 6 and FIG. 7, in an embodiment, a mobile terminal 100 may include a housing. The housing may include a front shell 402 and a back shell 29 connected to the front shell 402. A screen 60 may be embedded in the front shell 402 and having a display area. A frame 20 may include a pair of spaced and parallel wall 23 and wall 24 (referring to FIG. 1), engaged with the front shell 402 and back shell 29 to define a chamber 212 (referring to FIG. 2). The frame 20 may have a top connected with the wall 23 and the wall 24, and may be lower than tops of the front shell 402 and the back shell 29 such that a storage space 27 may be defined by a top of the frame 20 and the front shell 402 and the back shell 29. The chamber 212 and the storage space 27 may be divided by the top of the housing 20. A mother board 30 (referring to FIG. 2) may be received in the chamber 212. A slidable device 40 may be received in the storage space 27 and configured to move between a first position at which the slidable device 40 extends out of the storage space 27 and a second position at which the slidable device 40 retracts into the storage space 27. A camera 410 may be arranged on the slidable device 40 and connected with the mother board 30. When the slidable device 40 is at the first position, the camera 410 may be exposed out of the storage space 27; when the slidable device 40 is at the second position, the slidable device 40 may be covered by the display area and the camera 410 may be received in the storage space 27. A driving mechanism 50 (referring to FIG. 2) may be connected to the mother board 30, and may be received in the chamber 212 and may be configured to drive the slidable device 40 with the camera 410 to move between the first position and the second position. The slidable device 40 may include a pair of flanges 44 at two opposite faces. When the slidable device 40 is in the second position, the flanges 44 may engage with the tops of the front shell 402 and the back shell 29.

Referring to FIG. 1 and FIG. 2, in an embodiment, an electronic apparatus 100 may include a housing 20. The housing 20 may include a pair of spaced and parallel wall 23 and wall 24 and a top connected with the wall 23 and the wall 24. A first screen 60 may be engaged with the wall 23 and the wall 24 to define a chamber 212. The first screen 60 may have a top extending beyond the top of the housing 20 such that a storage space 27 may be defined by the top of the housing 20 and the first screen 60. A mother board 30 may be received in the chamber 212. A slidable device 40 may be received in the storage space 27 and may be configured to move between a first position at which the slidable device 40 extends out of the storage space 27 and a second position at which the slidable device 40 retracts into the storage space 27. A camera 410 may be arranged on the slidable device 40 and connected with the mother board 30. When the slidable device 40 is at the first position, the camera 410 may be exposed out of the storage space 27; when the slidable device 40 is at the second position, the slidable device 40 may be covered by the display area and the camera 410 may be received in the storage space 27. A second screen having a top may be higher than the top of the housing 20, and the first screen 60 and second screen and the top of the housing 20 may cooperatively define the storage space 27.

It is understood that the descriptions above are only embodiments of the present disclosure. It is not intended to limit the scope of the present disclosure. Any equivalent transformation in structure and/or in scheme referring to the instruction and the accompanying drawings of the present disclosure, and direct or indirect application in other related technical field, are included within the scope of the present disclosure.

What is claimed is:

1. A mobile terminal comprising:
   a housing, comprising:
     a front side face;
     a rear side face away from the front side face;
     a left side face and a right side face opposite to each other; and
     a top end face;
   wherein
     a storage groove is defined on the top end face of the housing;
     the storage groove is located between the front side face and the rear side face and extends to the left side face and the right side face to penetrate the left side face and the right side face of the housing;
     a mother board arranged into the housing;
     a first display screen coupled to the mother board and arranged on the front side face of the housing; and
     a mounting frame, wherein a first camera is arranged on the mounting frame and coupled to the mother board; the mounting frame is configured to extend itself out of the storage groove to expose the first camera or retract itself into the storage groove to hide the first camera into the housing.

2. The mobile terminal according to claim 1, wherein a back plate is arranged on the rear side face of the housing, and
   the storage groove defined on the top end face of the housing is located between the first display screen and the back plate.

3. The mobile terminal according to claim 1, wherein a front side of the storage groove extends to the front side face of the housing;
   a back side of the storage groove extends to the rear side face of the housing;
   a second display screen coupled to the mother board is arranged on the rear side face of the housing;
   the storage groove defined on the top end face of the housing is located between the first display screen and the second display screen; and
   a top end face of the second display screen is aligned with a top end face of the first display screen.

4. The mobile terminal according to claim 1, wherein
the mounting frame comprises a mounting box, and the first camera is mounted on the mounting box;
a left side face of the mounting box is aligned with the left side face of the housing;
a right side face of the mounting box is aligned with the right side face of the housing; and
a second camera coupled to the mother board is arranged on a face of the mounting box facing away the first display screen, and the second camera and the first camera are misaligned.

5. The mobile terminal according to claim 4, wherein
the first camera is arranged on a face of the mounting box facing the first display screen; and
a loudspeaker coupled to the mother board is arranged on the face of the mounting box facing the first display screen, and is adjacent to the top end face of the mounting box; and
the loudspeaker and the first camera are misaligned.

6. The mobile terminal according to claim 5, wherein
a gap is defined on the top end face of the mounting box adjacent to the loudspeaker, and the gap extends to the loudspeaker; and
the gap is configured to transmit sound from the loudspeaker without extending the mounting box out of the storage groove.

7. The mobile terminal according to claim 5, wherein
a baffle is arranged on a face of the mounting box facing the first display screen, and the baffle extends from the left side face of the mounting box to the right side face of the mounting box; and
the baffle is placed on the top end face of the first display screen when the mounting frame is retracted into the storage groove.

8. The mobile terminal according to claim 7, wherein
a front side face of the baffle is aligned with a front side face of the first display screen;
a gap is defined on the baffle, and the gap extends to the loudspeaker; and
the gap is configured to transmit sound from the loudspeaker without extending the mounting box out of the storage groove.

9. The mobile terminal according to claim 7, wherein
a connecting frame is arranged around peripheral sides of the first display screen;
a storage notch is defined on a top end face of the connecting frame corresponding to a position of the baffle, and the storage notch extends to the storage groove; and
the baffle is retracted into the storage notch when the mounting box is retracted into the storage groove.

10. The mobile terminal according to claim 9, wherein
an inclined guiding face is arranged on a side of the baffle adjacent to the first display screen; one end of the guiding face extends to the front side face of the mounting frame, and the other end of the guiding face extends to an edge on a top end face of the baffle facing the first display screen; and
a sliding face fit to the guiding face is arranged on an inner wall of the storage groove.

11. The mobile terminal according to claim 9, wherein
a gap is defined on the top end face of the mounting frame adjacent to the loudspeaker, and the gap extends to the loudspeaker; and
the gap is configured to transmit sound from the loudspeaker without extending the mounting box out of the storage groove.

12. The mobile terminal according to claim 1, wherein
the mobile terminal further comprises a driving device, and the driving device is configured to drive the mounting frame to extend itself out of the storage groove or retract itself into the storage groove.

13. The mobile terminal according to claim 12, wherein
the driving device comprises:
a driving component fixed in the housing and coupled to the mother board; and
a transmission rod arranged on the driving component; the transmission rod extending along a direction that the mounting frame extends itself out of the storage groove or retract itself into the storage groove; and
a spiral groove defined on transmission rod;
the mounting frame comprises:
an extending bar extending along the direction that the mounting frame extends itself out of the storage groove or retract itself into the storage groove; and
a block arranged on the extending bar and engaged with the spiral groove slidably;
wherein
the driving component drives the transmission rod to rotate, and the block slides along the spiral groove to slide the extending bar, the extending bar extends slidably along the direction that the mounting frame extends itself out of the storage groove or retract itself into the storage groove, so that the mounting frame extends itself out of the storage groove or retract itself into the storage groove.

14. The mobile terminal according to claim 12, wherein
the driving device comprises:
a motor fixed in the housing and coupled to the mother board; and
a screw rod coupled to the motor; the screw rod extending along the direction that the mounting frame extends itself out of the storage groove or retract itself into the storage groove;
a screw hole is defined on the mounting frame, and the screw hole is screwed to the screw rod; and the motor drives the screw rod to rotate to drive the mounting frame, so that the mounting frame extends itself out of the storage groove or retract itself into the storage groove.

15. The mobile terminal according to claim 12, wherein
the driving device comprises:
a motor fixed in the housing and coupled to the mother board;
a driving gear coupled to the motor; and
a rack arranged on the mounting frame and extending along the direction that the mounting frame extends itself out of the storage groove or retract itself into the storage groove;
teeth of the rack and teeth of the driving gear are engaged; and the motor drives the driving gear to rotate, to drive the rack to slide, so that the mounting frame extends itself out of the storage groove or retract itself into the storage groove.

16. The mobile terminal according to claim 12, wherein
the driving device comprises;
an electromagnet fixed in the housing and coupled to the mother board; and
a magnet arranged on the mounting frame and corresponding to the electromagnet;
when the mother board supplies power to the electromagnet, and magnetic poles between the electromagnet and the magnet are same, and the electromagnet and the magnet are mutually repelled, the mounting frame is driven to extend itself out of the storage groove; and when the mother board supplies power to the electromagnet and changes the power supply direction, and the magnetic poles between the electromagnet and the magnet become different, and the electromagnet and the magnet attract each other, the mounting frame is driven to retract itself into the storage groove.

17. The mobile terminal according to claim 12, wherein the driving device comprises:
   a motor fixed in the housing and coupled to the mother board;
   a driving gear coupled to the motor; and
   a transmission rod adjacent to the motor and extending along the direction that the mounting frame extends itself out of the storage groove or retract itself into the storage groove;
   a connecting rod adjacent to the transmission rod and sliding along the direction that the mounting frame extends itself out of the storage groove or retract itself into the storage groove;
   a driven gear arranged on one end of the transmission rod, and teeth of the driven gear and teeth of the driving gear are engaged;
wherein
   a spiral groove is defined on an outer peripheral face of the transmission rod along the direction that the mounting frame extends itself out of the storage groove or retract itself into the storage groove;
   a top end of the connecting rod is coupled to mounting box; and
   a sliding block is arranged slidably on a bottom end of the connecting rod; and the sliding block is configured to be engaged with the spiral groove corresponding to the transmission rod.

18. The mobile terminal according to claim 12, wherein the driving device comprises:
   a first elastic component elastically coupled between the housing and the mounting frame;
   a guiding bar arranged on the mounting frame along the direction that the mounting frame extends itself out of the storage groove or retract itself into the storage groove; and
   an alignment structure;
the alignment structure comprises:
   a rotating component rotatably coupled to the housing;
   a pressing component rotatably coupled to one end of the rotating component;
   an alignment sliding block rotatably coupled to the rotating component away from the other end coupled to the pressing component; and
   a second elastic component coupled to the alignment sliding block and configured to force the alignment sliding block to resume its original position;
wherein
the alignment sliding block is configured to align the guiding bar;
the pressing component extends away from the rotating component to extend from the housing; and
the pressing component is pressed to drive the rotating component to rotate,
so that the rotating component drives the alignment sliding block out of an alignment of the guiding bar, and the first elastic component resumes from its deformation to push the mounting frame to extend itself out of the storage groove.

19. A mobile terminal, comprising:
a housing, comprising:
   a front shell;
   a back shell connected to the front shell;
   a screen embedded in the front shell and having a display area;
   a frame comprising a pair of spaced and parallel walls engaged with the front and back shells to define a chamber, wherein the frame has a top connected with the walls and lower than tops of the front and back shells such that a storage space is defined by a top of the frame and the front and back shells; the chamber and the storage space are divided by the top of the housing; the storage space extends to a left side face and a right side face of the frame to penetrate the left side face and the right side face of the frame;
   a mother board received in the chamber;
   a slidable device received in the storage space and configured to move between a first position at which the slidable device extends out of the storage space and a second position at which the slidable device retracts into the storage space, wherein a camera is arranged on the slidable device and connected with the mother board, when the slidable device is at the first position, the camera is exposed out of the storage space; when the slidable device is at the second position, the slidable device is covered by the display area and the camera is received in the storage space; and
   a driving mechanism connected to the mother board, received in the chamber and configured to drive the slidable device with the camera to move between the first position and the second position;
wherein
   the slidable device comprises a pair of flanges at two opposite faces, when the slidable device is in the second position, the flanges engage with the tops of the front and back shells.

20. An electronic apparatus, comprising:
a housing comprising a pair of spaced and parallel walls and a top connected with the walls; and
a first screen engaged with the walls to define a chamber, wherein the first screen has a top extending beyond the top of the housing such that a storage space is defined by the top of the housing and the first screen;
a mother board received in the chamber; and
a slidable device received in the storage space and configured to move between a first position at which the slidable device extends out of the storage space and a second position at which the slidable device retracts into the storage space, wherein a camera is arranged on the slidable device and connected with the mother board, when the slidable device is at the first position, the camera is exposed out of the storage space; when the slidable device is at the second position, the slidable device is covered by the display area and the camera is received in the storage space;
wherein
   a second screen having a top is higher than the top of the housing, and the first and second screens and the top of the housing cooperatively define the storage space.

* * * * *

UNITED STATES PATENT AND TRADEMARK OFFICE
CERTIFICATE OF CORRECTION

PATENT NO. : 10,841,407 B2  
APPLICATION NO. : 16/215260  
DATED : November 17, 2020  
INVENTOR(S) : Xiaoyu Fan et al.

Page 1 of 1

It is certified that error appears in the above-identified patent and that said Letters Patent is hereby corrected as shown below:

On the Title Page

Item (71) Applicant reads:  
"GUANGDONG OPPO MOBILE TELECOMMUNICATIONS CORP., LTD., Guangdong (CN)"

Should read:  
--GUANGDONG OPPO MOBILE TELECOMMUNICATIONS CORP., LTD., Dongguan, Guangdong (CN)--

Item (73) Assignee reads:  
"GUANGDONG OPPO MOBILE TELECOMMUNICATIONS CORP., LTD., Guangdong (CN)"

Should read:  
--GUANGDONG OPPO MOBILE TELECOMMUNICATIONS CORP., LTD., Dongguan, Guangdong (CN)--

Signed and Sealed this  
Twenty-second Day of December, 2020

Andrei Iancu  
*Director of the United States Patent and Trademark Office*